(12) United States Patent
Wang et al.

(10) Patent No.: US 9,170,817 B2
(45) Date of Patent: Oct. 27, 2015

(54) REDUCING BRANCH CHECKING FOR NON CONTROL FLOW INSTRUCTIONS

(75) Inventors: Kai-Feng Wang, Beijing (CN);
Hong-Xia Sun, Beijing (CN);
Yong-Qiang Wu, Beijing (CN)

(73) Assignee: STMicroelectronics (Beijing) R&D Co., Ltd., Beijing (CN)

( * ) Notice: Subject to any disclaimer, the term of this patent is extended or adjusted under 35 U.S.C. 154(b) by 1527 days.

(21) Appl. No.: 12/535,590

(22) Filed: Aug. 4, 2009

(65) Prior Publication Data
US 2010/0169625 A1    Jul. 1, 2010

(30) Foreign Application Priority Data
Dec. 25, 2008    (CN) .......................... 2008 1 0190998

(51) Int. Cl.
*G06F 9/38*    (2006.01)

(52) U.S. Cl.
CPC ............ *G06F 9/3806* (2013.01); *G06F 9/3844* (2013.01)

(58) Field of Classification Search
None
See application file for complete search history.

(56) References Cited

U.S. PATENT DOCUMENTS

| | | | |
|---|---|---|---|
| 2004/0181654 A1* | 9/2004 | Chen | ............................ 712/239 |
| 2005/0149769 A1 | 7/2005 | O'Connor | |
| 2005/0268040 A1* | 12/2005 | Lee | ............................... 711/125 |
| 2007/0192574 A1 | 8/2007 | Park | |
| 2008/0046702 A1* | 2/2008 | Morrow | ......................... 712/238 |
| 2008/0082843 A1* | 4/2008 | Schuler et al. | ................ 713/323 |

OTHER PUBLICATIONS

Kahn, Roger; Weiss, Shlomo. "Thrifty BTB: a comprehensive solution for dynamic power reduction in branch target buffers" Microprocessors and Microsystems 32. 8 (Nov. 2008): 425-36.*

Deris, K. J.; Baniasadi, A. "Branchless cycle prediction for embedded processors" In Applied Computing 2006. 21st Annual ACM Symposium on Applied Computing, 928-32 vol. 12 vol. (Iii+1929);2 vol. (Iii+1929). New York, NY, USA:ACM, 2006.*

European Search Report dated Mar. 3, 2010 from corresponding European Application No. 09180316.3.

Anonymous, *Decode Branch History Table*.Oct. 1982, IBM Technical Disclosure Bulletin, vol. 25, No. 5, Oct. 1, 1982, pp. 2396-2398, XP013039946.

Chinese Office Action dated Apr. 12, 2012 from corresponding Chinese Application No. 2008101909980.

English translation of the Chinese Office Action dated Apr. 12, 2012 from corresponding Chinese Application No. 2008101909980.

* cited by examiner

*Primary Examiner* — Jacob A Petranek
(74) *Attorney, Agent, or Firm* — Seed IP Law Group PLLC

(57) ABSTRACT

Some microprocessors check branch prediction information in a branch history table and/or a branch target buffer. To check for branch prediction information, a microprocessor can identify which instructions are control flow instructions and which instructions are non control flow instructions. To reduce power consumption in the branch history table and/or branch target buffer, the branch history table and/or branch target buffer can check for branch prediction information corresponding to the control flow instructions and not the non control flow instructions.

14 Claims, 6 Drawing Sheets

Branch Instruction

REDUCING BRANCH CHECKING FOR NON CONTROL FLOW INSTRUCTIONS

CROSS REFERENCE TO RELATED APPLICATIONS

This application claims the priority benefit of Chinese patent application number 200810190998.0, filed on Dec. 25, 2008, entitled "REDUCING BRANCH CHECKING FOR NON CONTROL FLOW INSTRUCTIONS," which is hereby incorporated by reference to the maximum extent allowable by law.

BACKGROUND OF THE INVENTION

1. Field of the Invention

The techniques described herein generally relate to microprocessors, and in particular to reducing power consumption for branch prediction.

2. Discussion of Related Art

Microprocessors are electronic devices that can perform a variety of computing operations in response to instructions that implement a computer program. A common technique for implementing computer programs is to send multiple instructions to the execution unit of the microprocessor in a predetermined sequence, and these instructions are then executed in sequential order. In some circumstances, program execution jumps out of order to execute an instruction which is not the next instruction in the sequence. One example of an instruction that causes the execution to jump out of sequence is a branch instruction. When a branch instruction is executed, the microprocessor can jump to the target instruction identified by the branch instruction, and the microprocessor executes the target instruction next, rather than the next sequential instruction.

By way of illustration, FIG. 1 shows one example of a program execution sequence in which five sequential instructions 1-5 are executed in a sequential manner, with instruction 1 being executed first, instruction 2 being executed second, etc. In this example, instruction 5 is a branch instruction that specifies instruction 2 as its target instruction. Upon executing branch instruction 5, the microprocessor jumps out of the sequential order of instructions to execute instruction 2 next in the order of program execution, rather than the next sequential instruction 6.

Microprocessors often process instructions using several stages, which can include an instruction fetch stage in which the instructions are fetched from an instruction cache, an instruction decode stage in which the fetched instructions are decoded, and an instruction execution stage in which the instruction is executed. To improve the speed at which multiple instructions are processed through the various stages, some microprocessors use a technique known as pipelining. Pipelining is analogous to an assembly line, in the sense that multiple stages of the pipeline concurrently perform different parts of the process on several different instructions. In one example of a pipelining technique, the first instruction 1 is processed by the first stage of the pipeline in a first computing cycle. In the second cycle, the first instruction 1 goes on to the second stage of the pipeline and the second instruction 2 begins the first stage of the pipeline. In the third cycle, the first instruction 1 proceeds to the third stage of the pipeline, the second instruction 2 proceeds to the second stage of the pipeline, and the third instruction 3 begins the first stage of the pipeline, etc. Pipelining can enable multiple instructions to be executed more quickly than would be the case if only one instruction were processed at a time by the microprocessor. For example, pipelining techniques may allow the processing of a different instruction to be completed in each cycle.

Branch instructions can reduce the efficiency of pipelining techniques. When a branch instruction is executed, the microprocessor may attempt to jump out of the sequential order to execute a target instruction that is not already in the pipeline. To jump to the target instruction, the microprocessor may discard the instructions that are already in the pipeline and re-start the pipeline beginning at the target instruction. As a consequence, a delay can occur while the target instruction is fetched and processed by the initial stages of the pipeline, causing an overall reduction in the speed at which instructions are processed through the pipeline.

Branch prediction is a technique that has been used to improve the speed of pipelined microprocessors that execute branch instructions. Branch prediction can increase the speed of pipelined microprocessors by enabling the microprocessor to fetch the instruction that is likely to be executed after a branch instruction, prior to executing the branch instruction. Branch prediction may involve predicting whether or not a conditional branch is taken, and/or predicting the branch target, which is the target instruction of the branch instruction. For example, when the microprocessor determines that a conditional branch is likely to be taken, the predicted target instruction may be fetched into the pipeline in advance of executing the branch instruction to prepare the pipeline for the branch operation.

A branch history table is a branch prediction unit that can store historical information about whether previous branches were taken, and this historical information can be used to predict whether future branches will be taken. A branch target buffer is a branch prediction unit that can predict the target of a branch instruction. Some microprocessors use both a branch history table and a branch target buffer to perform branch prediction.

SUMMARY OF THE INVENTION

Some embodiments relate to a microprocessor that executes instructions. The microprocessor fetches a group of instructions that includes at least one control flow instruction and at least one non control flow instruction. The microprocessor includes a control instruction identification unit and a branch prediction unit. The control instruction identification unit stores control instruction identification information identifying the at least one non control flow instruction in the fetched group of instructions. The branch prediction unit checks for stored branch prediction information corresponding to the at least one control flow instruction and does not check for stored branch prediction information corresponding to the at least one non control flow instruction.

Some embodiments relate to a method of checking branch prediction information in a microprocessor, in which one or more control flow instructions in the group of fetched instructions are identified. Branch prediction information is checked for the control flow instructions and is not checked for the non control flow instructions.

BRIEF DESCRIPTION OF THE DRAWINGS

In the drawings, each identical or nearly identical component that is illustrated in various figures is represented by a like numeral. For purposes of clarity, not every component may be labeled in every drawing. In the drawings.

DETAILED DESCRIPTION

Figure 1:
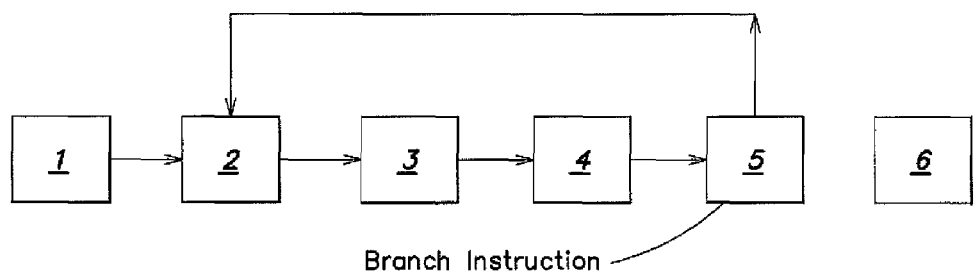
FIG. 1 shows an example of a program execution sequence that includes a branch instruction.

As discussed above, branch instructions can reduce the speed of a microprocessor's pipeline, and some microprocessors include hardware component(s) such as a branch history table (BHT) and/or a branch target buffer (BTB) that provide branch prediction information which can be used to improve the speed of the pipeline. Some microprocessors, such as superscalar microprocessors, use both a branch history table and a branch target buffer to improve performance. A superscalar microprocessor is a processor that can execute more than one instruction in a cycle using several functional units within the microprocessor core, such as arithmetic logic units and/or other functional units. In a superscalar processor, several instructions may be fetched in parallel from the instruction cache. While the instruction fetch is being performed, the BHT and/or BTB may be checked concurrently for branch prediction information about the fetched instructions. For example, if four instructions are fetched in the instruction fetch stage, the BHT and/or BTB may be checked for any branch prediction information that corresponds to the four fetched instructions. If one or more of the instructions is a branch instruction, the BHT and/or BTB can provide the corresponding branch prediction information which may be used to improve the speed of the pipeline. For example, if a conditional branch is predicted to be taken, the microprocessor can prepare in advance by fetching the target instruction prior to execution of the branch instruction.

It has been appreciated that accessing the BHT and/or BTB for branch prediction information can consume a significant amount of power, particularly when checking multiple instructions in parallel. According to prior techniques, if several instructions were fetched in parallel, all of the fetched instructions would be checked by the BHT and BTB for corresponding branch prediction information. However, it has been appreciated that checking all of the fetched instructions may consume a significant amount of power, and checking all of the fetched instructions may not be necessary. In particular, it has been appreciated that only control flow instructions may potentially perform a branch operation, however, non control flow instructions may not perform a branch operation. Control flow instructions can cause a decision as to the program flow to be executed by the microprocessor, and have the potential to cause a branch operation. However, non control flow instructions do not affect the program flow, and do not have the potential to cause a branch operation. Thus, checking non control flow instructions in the BHT and BTB can be unnecessary because non control flow instructions do not perform branch operations, and the BHT and BTB will have no corresponding branch prediction information for non control flow instructions. Accordingly, it has been appreciated that a significant amount of power can be saved by reducing or preventing access to the BHT and/or BTB for non control flow instructions.

In some embodiments, a microprocessor is configured such that the control flow instructions in a fetched group are checked in the BHT and/or the BTB for corresponding branch prediction information, and non control flow instructions in the fetched group are not checked for branch prediction information. Such a technique can reduce the number of instructions that are looked up in the BHT and/or BTB, and thus reduce the amount of power consumed by the BHT and/or the BTB.

Simulation results have shown that for many applications, only a small number of the fetched instructions are control flow instructions that can cause a branch operation. For example, in a microprocessor having a fetch bandwidth of four instructions, most fetch blocks may contain zero, one or two control flow instructions, and very few fetch blocks may contain three or four control flow instructions. For some instruction set architectures (ISA) such as MIPS (Microprocessor without Interlocked Pipeline Stages), a control instruction may be followed by a delay slot instruction which is not a control flow instruction. In such architectures, a fetch block of four instructions may contain no more than two control flow instructions. Because of the relatively low number of control flow instructions, the number of accesses to the BTB or BHT can be reduced by preventing access to the BTB and/or BHT by some or all non control flow instructions, which can allow significant power savings in the BTB and/or BHT.

In some embodiments, the control flow and non control flow instructions can be identified in advance of execution to reduce or eliminate accesses to the BTB and/or BHT based on non control flow instructions. After it is determined which instructions in a group of fetched instructions are non control flow instructions, access to the BTB and/or BHT can be prevented or reduced for the non control flow instructions. Simulation results have shown that a significant amount of power savings can be achieved using such techniques, and, in some circumstances, the total power consumption of the BTB and BHT can be reduced by 58.38%. However, the amount by which the power consumption is reduced may be higher or lower depending on the particular implementation.

Figure 2:
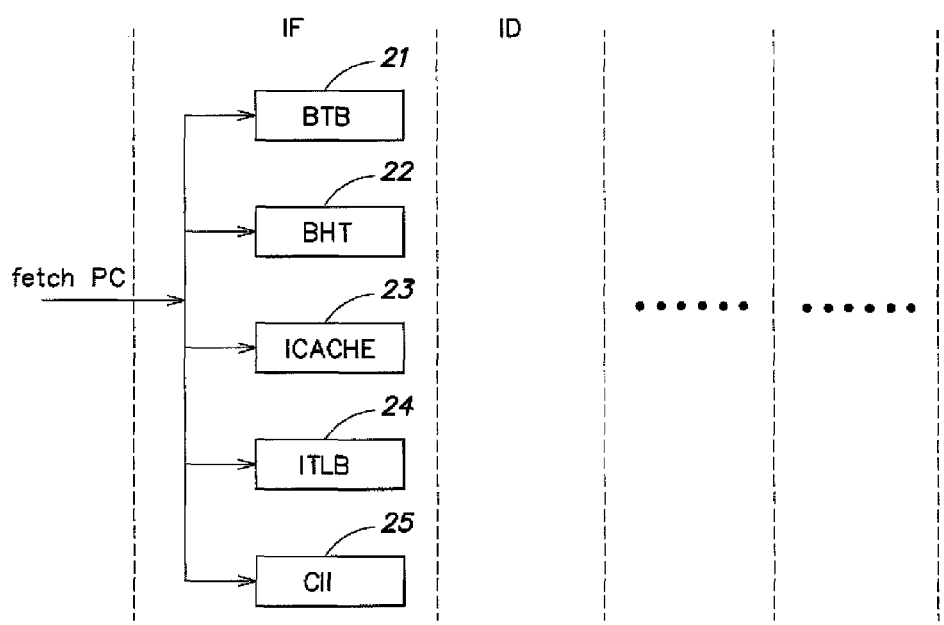
FIG. 2 shows a front-end pipeline of a superscalar microprocessor, according to some embodiments.

FIG. 2 shows a front-end pipeline of a superscalar microprocessor, according to some embodiments. In this example, the first stage of the pipeline is an instruction fetch stage in which instructions are fetched from the instruction cache 23 for further processing and execution. Accesses to BTB 21, BHT 22, instruction translation lookaside buffer (ITLB) 24, and control instruction identification unit (CII) 25 are also performed concurrently with the instruction fetch during this stage. Operation of the BTB 21, BHT 22 and control instruction identification unit 25 are discussed in further detail below. In some embodiments, devices 21-25 are accessed using the program counter (PC) of the microprocessor as an index that keeps track of the current location of the program within the instruction execution sequence. For example, the BTB 21 and BHT 22 can be indexed using one or more PCs of the instructions being fetched from the instruction cache, and the BTB 21 and/or BHT 22 can search for corresponding branch prediction information using the index.

Figure 3:
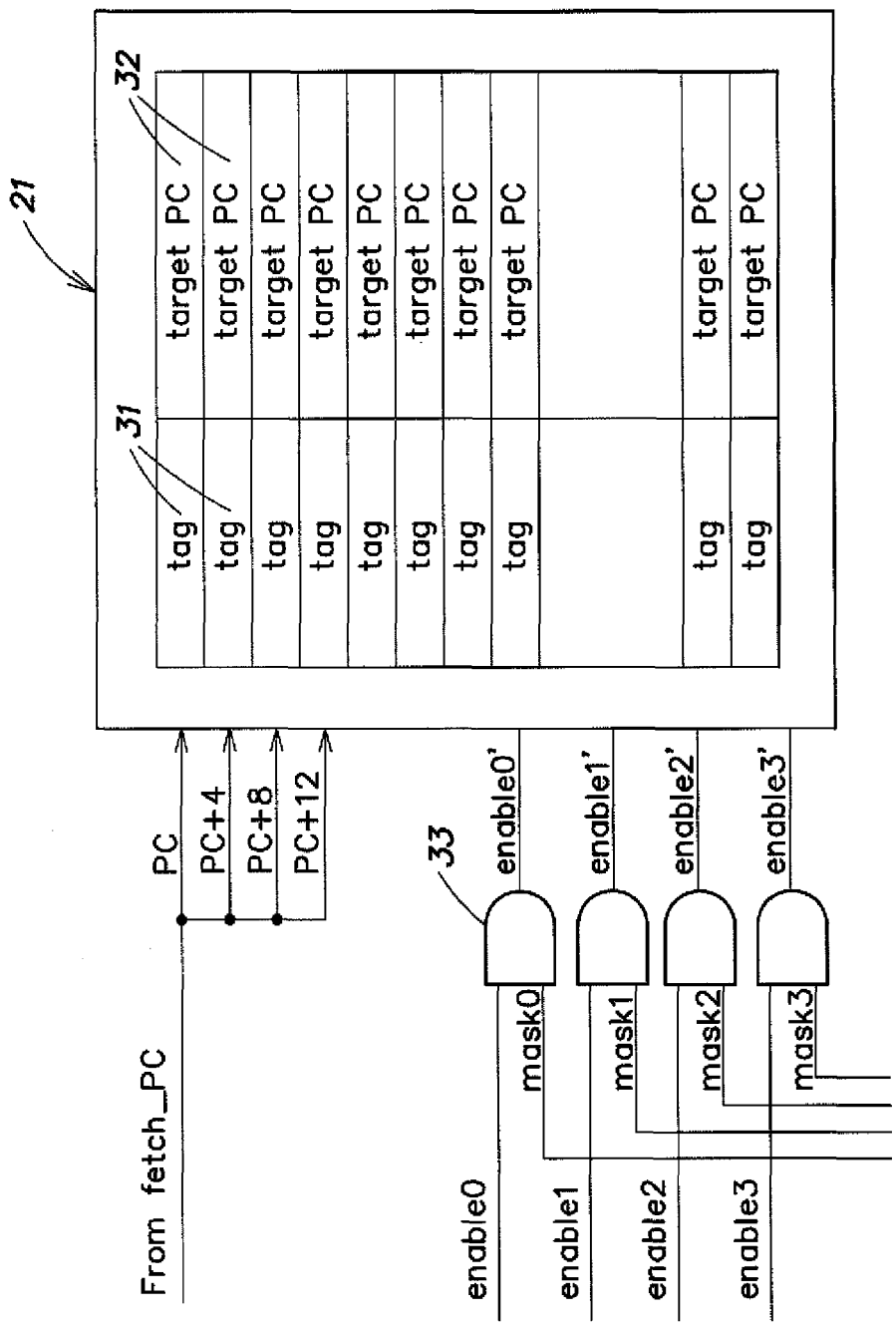
FIG. 3 shows a branch target buffer having index inputs that can be disabled for non control flow instructions, according to some embodiments.

FIG. 3 shows an example of a branch target buffer 21 that stores branch prediction information, according to some embodiments. Branch target buffer 21 stores several tags 31 individually representing branch instructions, and also stores the indices of their corresponding predicted branch targets as target PCs 32. Branch target buffer 21 can be checked for branch prediction information by comparing the index with the tags 31 to determine whether there is a BTB "hit," which means that the BTB 21 stores branch prediction information corresponding to the index that is being looked up.

The BTB 21 may be accessed concurrently by more than one index to look up more than one instruction in a fetch group. For example, if a group of four instructions is currently being fetched from the instruction cache, branch target buffer 21 may be accessed simultaneously according to the four program counters of the four fetched instructions. For example, for an instruction set architecture such as a RISC (Reduced Instruction Set Computer) each instruction may be four bytes (32 bits) long. In some microprocessor memory systems, the minimum addressable unit is one byte. Thus the indices used to access the BTB 21 may be separated by increments of four bytes in a RISC microprocessor. For example, in a RISC microprocessor with a fetch bandwidth of four instructions, four indices may be used to access the BTB 21 concurrently such as PC, PC+4, PC+8 and PC+12. All four indices may be provided to the BTB 21 and used to access the branch target buffer at the same time, as illustrated in FIG. 3. If there is a BTB "hit," the target PC of the "hit" instruction may be used to redirect the instruction fetch to the corresponding target PC of the branch instruction. If multiple BTB hits occur for the group of fetched instructions, the target PC of the earliest instruction in the program sequence may be used to redirect the instruction fetch to the corresponding target PC. Although a RISC implementation has been discussed in which each instruction is four bytes long, the techniques described herein are not limited to this implementation, as instructions of any suitable length may be used, such as greater or fewer than four bytes. The techniques described herein can also be used in microprocessors in which the instruction length is not fixed, and which have a variable instruction length. In such microprocessors, the address difference between adjacent instructions may not be equal to four.

As discussed above, it has been appreciated that the power consumed by the BTB 21 can be reduced by decreasing the number of accesses to the BTB 21 for non control flow instructions. Once the control flow instructions in a fetched group are identified, access to the BTB 21 can be limited so that only the control flow instructions are looked up in BTB 21. As shown in FIG. 3, in some embodiments the BTB 21 includes "enable" inputs that can be used to enable or disable a corresponding instruction from being looked up in the BTB 21. The BTB 21 illustrated in FIG. 3 has four enable inputs, one for each of the four instruction indices that can be looked up concurrently. In this example, input enable0' is used to enable the first instruction index (PC), input enable1' is used to enable the second instruction index (PC+4), input enable2' is used to enable the third instruction index (PC+8), and input enable3' is used to enable the fourth instruction index (PC+12). If the corresponding enable input receives a signal having a high logic value, then the corresponding instruction index input can be enabled, allowing the instruction to be looked up in the BTB 21. If the corresponding enable input receives a signal having a low logic value, the corresponding instruction index input can be disabled, preventing the instruction from being looked up in the BTB 21. However, this is just an example, and it should be appreciated that the techniques described herein can be used with any suitable logic levels.

In some embodiments, the enable' signals shown in FIG. 3 may be provided to BTB 21 by one or more logic circuits 33, such as the AND gates shown in FIG. 3. In this example, the four AND each have two inputs: a corresponding enable signal that can be used to enable overall operation of an instruction index input, and a corresponding mask input signal that can be used to disable the instruction index input for non control flow instructions. An exemplary technique for the generation of these mask signals is discussed in further detail below with respect to FIG. 7.

Figure 4:
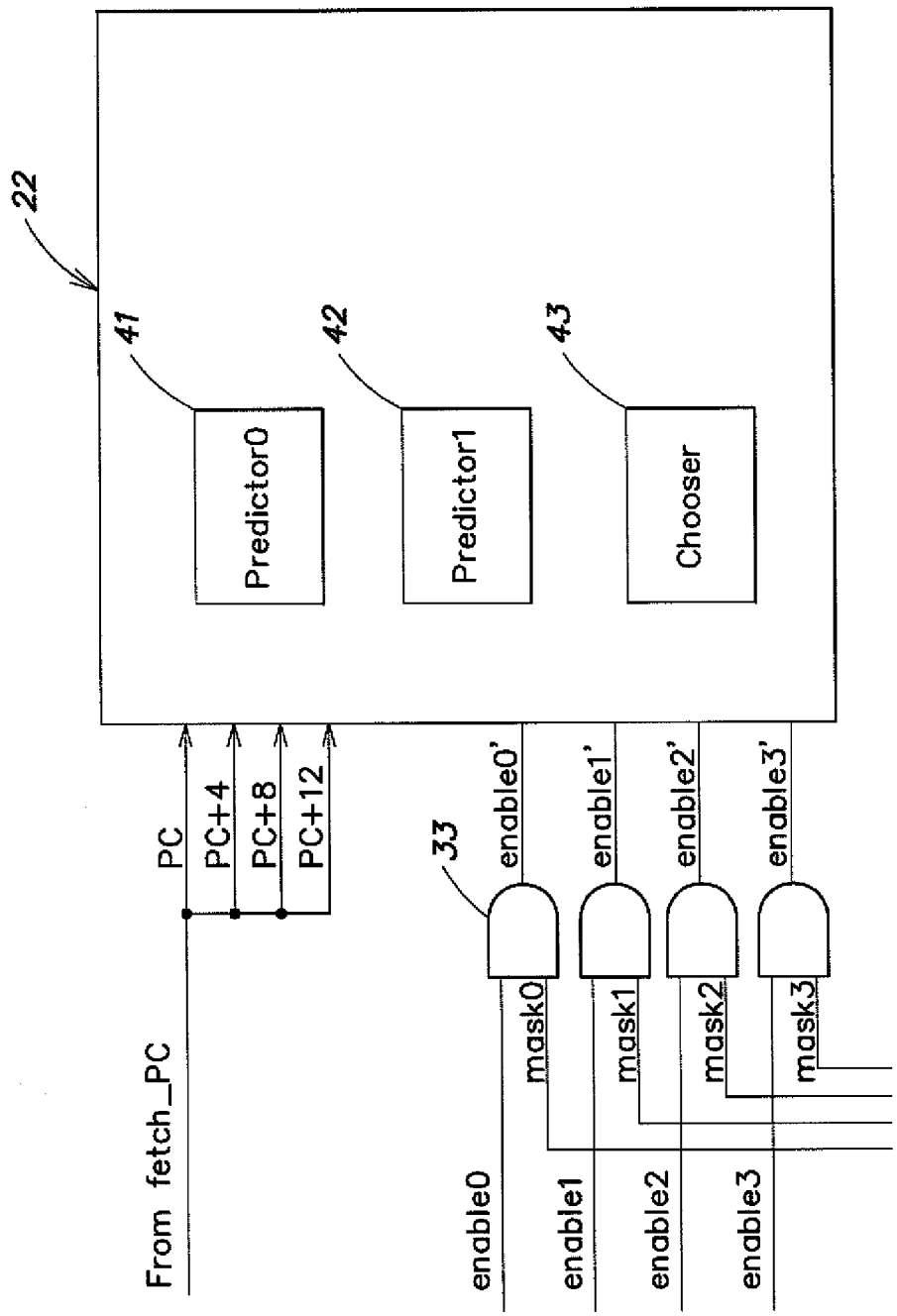
FIG. 4 shows a branch history table having index inputs that can be disabled for non control flow instructions, according to some embodiments.

FIG. 4 shows an example of a branch history table 22 that can store branch history information about prior branches and predict future branches, according to some embodiments. Branch history table 22 may store branch history information about whether or not previous conditional branches have been taken. Branch history table 22 may use the branch history information to predict whether a conditional branch will be taken in the future. As shown in FIG. 4, branch history table 22 includes prediction units 41 and 42, which can perform different types of branch prediction using any suitable techniques. Branch history table 22 also includes a chooser 43 that selects which type of branch prediction to use, and may choose which prediction unit to use, such as prediction unit 41 or 42. As with the branch target buffer 21, if four instructions are being fetched from the instruction cache, four corresponding indices may be used to access the branch history table 22 simultaneously, such as PC, PC+4, PC+8 and PC+12, as shown in FIG. 4.

As discussed above, it has been appreciated that the power consumed by the BHT 22 can be reduced by reducing the number of accesses to the BHT 22 based on non control flow instructions. Once the control flow instructions in a fetched group are identified, access to the BHT 22 can be limited so that only the control flow instructions are looked up in BHT 22 for any corresponding branch prediction information. As shown in FIG. 4, in some embodiments the BHT 22 includes "enable" inputs that can be used to enable or disable a corresponding instruction from being looked up in the BHT 22. These enable inputs may function similarly to the enable inputs discussed above with respect to the BTB 21, in some embodiments.

In some microprocessors, the prediction results of the BTB and BHT may be transferred to the decode stage, in which the prediction results of the BTB and BHT are compared. According to some techniques, when prediction results from the BTB and BHT are inconsistent with one another, the BHT prediction result may be used. However, it should be appreciated that the prediction results of either the BTB or BHT may be used, or both, as the invention is not limited as to the use of a particular branch prediction technique or device.

Some embodiments relate to identifying the control flow instructions in a group of fetched instructions in advance of fetching the group of instructions from the instruction cache. After the control instructions are identified, then the PCs of the control instructions may be used to access the BTB and/or BHT, rather than all of the instructions in the fetched group, for example. In some embodiments, a microprocessor includes an instruction cache tag array that stores control instruction identification information identifying the control flow instructions. The control identification information may be stored in the instruction cache tag array, or in another suitable location.

Figure 5:
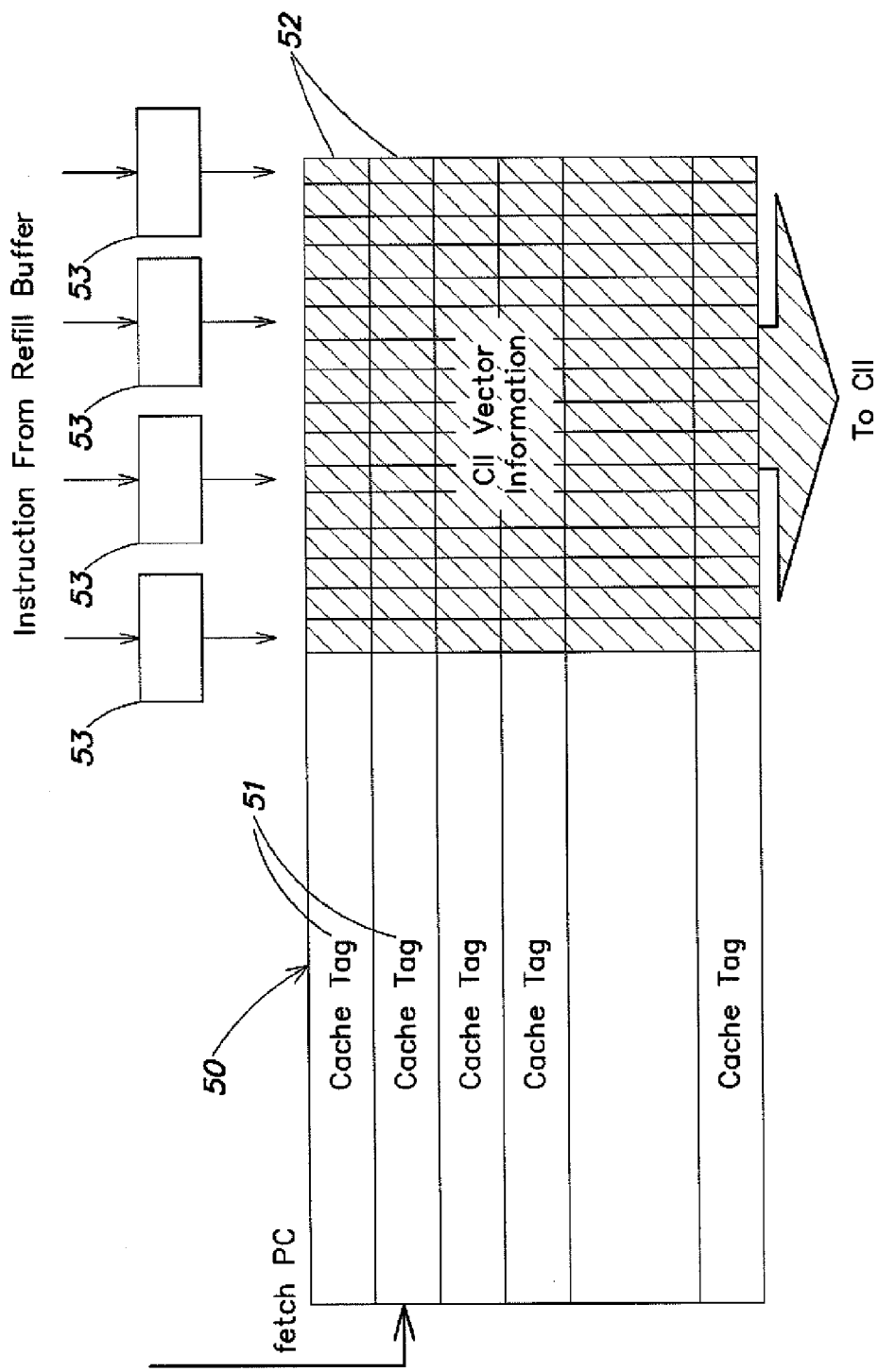
FIG. 5 shows an instruction cache tag array that stores control instruction identification information, according to some embodiments.

FIG. 5 shows an example of an instruction cache tag array 50 associated with an instruction cache 23 that stores multiple instructions, according to some embodiments. An instruction cache may include a plurality of "lines," each storing multiple control instructions, and each line may be associated with a cache tag 51 in the instruction cache tag array. For each line of the instruction cache, the instruction tag array may store corresponding control instruction identification information 52 that includes control instruction identification bits. In this example, each cache line stores sixteen instructions, and the instruction cache tag array stores a corresponding set of sixteen control instruction identification bits for each cache line. Each control instruction identification bit identifies whether a corresponding instruction in the instruction cache is a control flow instruction or a non control flow instruction. In this example, a "1" indicates that the corresponding instruction is a control flow instruction, and a "0" indicates that the corresponding instruction is not a control flow instruction. However, this is just an example, and any suitable type of control identification information may be used to identify control flow instructions and/or non control flow instructions. To obtain the control instruction identification information for storage in the instruction cache tag array, one or more decoders 53 may pre-decode the instructions to generate the control instruction identification information 52. The control instruction identification information 52 for a line of the instruction cache may be stored when performing instruction cache line refilling, for example, or at another suitable time. Some microprocessors use a refill unit that is responsible for refilling the instruction cache tag array and data array from the instructions received though the memory bus. The refill unit can provide the instructions to one or more decoders that extract information from each instruction and determine, based on the extracted information, whether each instruction is a control flow instruction or a non control flow instruction. For example, a decoder may extract the instruction's optcode which indicates which type of instruction it is. By examining the optcode for each instruction, the decoder can determine which instructions are control instructions and which instructions are non control flow instructions.

One potential limitation of the instruction cache tag array 50 is that that the BHT 22 and BTB 21 may be accessed at the same time that the instructions are being fetched from the instruction cache, and the control instruction identification information 52 may not be available at that time to the BHT 22 and BTB 21 from the instruction cache tag array 50. The instruction cache tag array 50 may not be able to access the control instruction identification information 52 quickly enough for use in enabling/disabling inputs to the BHT 22 and/or BTB 21. To provide this control identification information 52 to the BHT 22 and BTB 21, another device may be used, which is referred to herein as a control instruction identification unit (CII).

Figure 6:
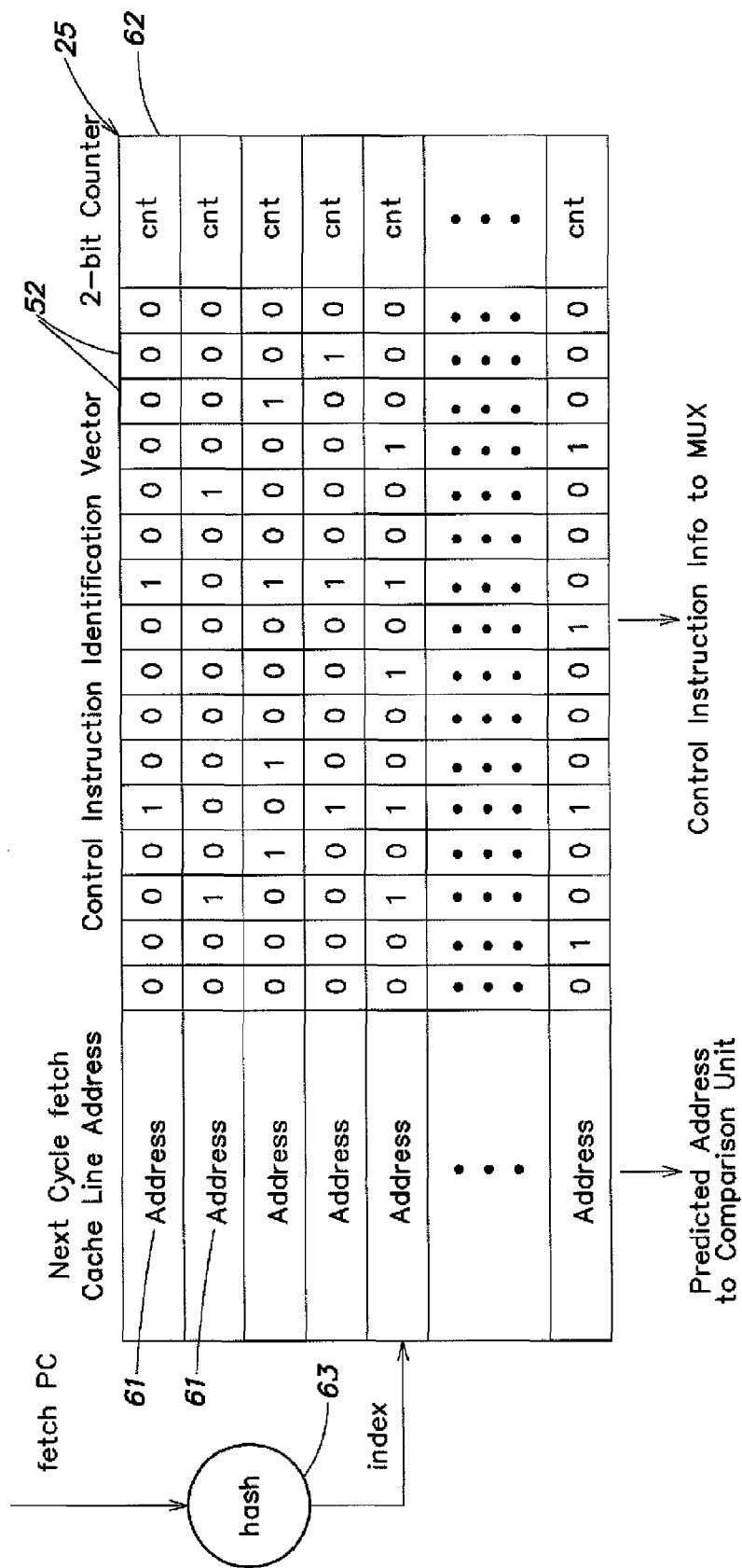
FIG. 6 shows an example of a control instruction identification unit that can store control identification information to enable/disable index input(s) to BHT and/or BTB, according to some embodiments.

FIG. 6 illustrates an example of control instruction identification unit 25 that can store the control instruction identification information 52 for use in enabling/disabling inputs to the BTB 21 and/or BHT 22, according to some embodiments. The control instruction identification unit 25 can be considered to be a prediction unit like the BTB or BHT, and can predict the next cache line address. By predicting the next cache line address, the CII 25 can obtain the control instruction identification information 52 for next cache line in advance so that, when the next cache line is accessed by the fetch unit, the control identification information 52 for this cache line is available in the CII, and this information can be provided to the BTB and/or BHT so that the BTB and/or BHT can be accessed only for the control flow instructions.

The control instruction identification unit 25 may store three types of information for a line of the instruction cache: cache line address 61, control instruction identification information 52, and a saturated counter 62. The cache line address 61 for a particular cache line entry can be the predicted next line of the instruction cache. The control instruction identification information 52 for a cache line identifies the control flow instructions and non control flow instructions for an associated line of the instruction cache. The saturated counter 62 may include two bits which may function in a similar manner to saturated counters used in other prediction units like the BHT, and may be used to improve the prediction accuracy. In some implementations, when the value of the saturated counter 62 is equal to two or more, the prediction of the next cache line is made by the CII unit 25 because the prediction is determined to be strong. However, when the value of the counter is lower than two, the prediction may be determined not to be accurate enough, and the prediction may not be made. However, it should be appreciated that any suitable prediction techniques may be used, and the techniques described herein are not limited to the use of a saturated counter.

Control instruction identification unit 25 may receive and store the control instruction identification information 52 from the instruction cache tag array 50, along with corresponding cache line addresses 61. The control instruction identification unit 25 may be accessed at the same time as the BHT, BTB, instruction cache and ITLB using the current PC being fetched. Each cycle, the control instruction identification unit 25 may predict the next cache line address for the group of instructions. Each cycle, the cache line address predicted by the control instruction identification unit 25 may be compared with the current PC being fetched from the instruction cache. If the two addresses match, then the prediction provided by the control instruction identification unit 25 was correct, and the corresponding control instruction identification information provided by the control instruction identification unit 25 correctly identifies the control flow and non control flow instructions in the fetched block of instructions. The BTB 21 and BHT 22 can then be accessed according to the identified control flow instructions and not accessed for the non control flow instructions. However, if the two addresses do not match, then the address predicted in the previous cycle was not correct, and the control identification information provided may not correspond with the instructions currently being fetched. When the predicted cache line is determined to be incorrect, all of the fetched instructions may be checked in the BHT and/or BTB.

An example will now be described to illustrate the operation of control instruction identification unit 25. In a first cycle (cycle_0), the program counter (PC_0) for a first line of the instruction cache (cacheline_0) can be used to access the CII 25. CII 25 can be accessed using PC_0 at the same time as this program counter is used to access the instruction cache, BTB and BHT. Hash function unit 63 may calculate a hash function on the program counter PC_0 to generate an index (index_0), and this index can be used to access the CII 25 to look up the next cache line information. In a later cycle (cycle_m), the next line (cacheline_1) of the instruction cache may be accessed. The address for cacheline_1 may be obtained from the instruction fetch unit. If there is a cache line hit in the instruction cache for cacheline_1, the control instruction identification information 52 can be obtained based on the corresponding entry in the instruction cache tag array. If the cache line (cacheline_1) is missed in the instruction cache, the cache line can be fetched from memory and refilled to the instruction cache. When the cache line is refilled, the corresponding control instruction identification information can be generated by the decoder(s) 53 of the refill unit. When the control instruction information for cacheline_1 is received, it is known that cacheline_1 is the next cache line to cacheline_0. In cycle_0, the CII unit made a prediction which is CII[index0]. The control instruction identification information in CII 25 at CII[index_0] can be read out from the CII 25 for use during a future cycle (cycle_m) when accessing the next cache line (cacheline_1), and this information can be used to enable or disable inputs to the BTB and/or BHT.

If the cacheline_1 address is equal to the CII[index0] address which is predicted in cycle_0, this means that the prediction in cycle_0 was correct, so the control instruction information request from cycle_0 can be used in this cycle to enable/disable the BTB/BHT accessing. In addition, the saturated counter 62 in CII[index0] is increased by "1", which means that the CII unit 25 made a correct prediction. However, if the fetched cache line address is not equal to the CII[index0] address, the means that the prediction in cycle_0 was wrong, and the control instruction identification information 52 requested in cycle_0 is not the information corresponding to cacheline_1. In these circumstances, CII information correction may be carried out. As with BHT information correction, a CII entry may not be replaced with new cache line information at once. Before replacing the information at CII[index0], the saturated counter 62 for CII [index0] may be checked. In some implementations, if the counter is not equal to "0", the CII[index0] is not replaced, and the "counter" may be decreased by 1. If the saturated counter 62 of CII[index0] is equal to "0", the CII[index0] may be replaced with the information for cacheline_1.

Figure 7:
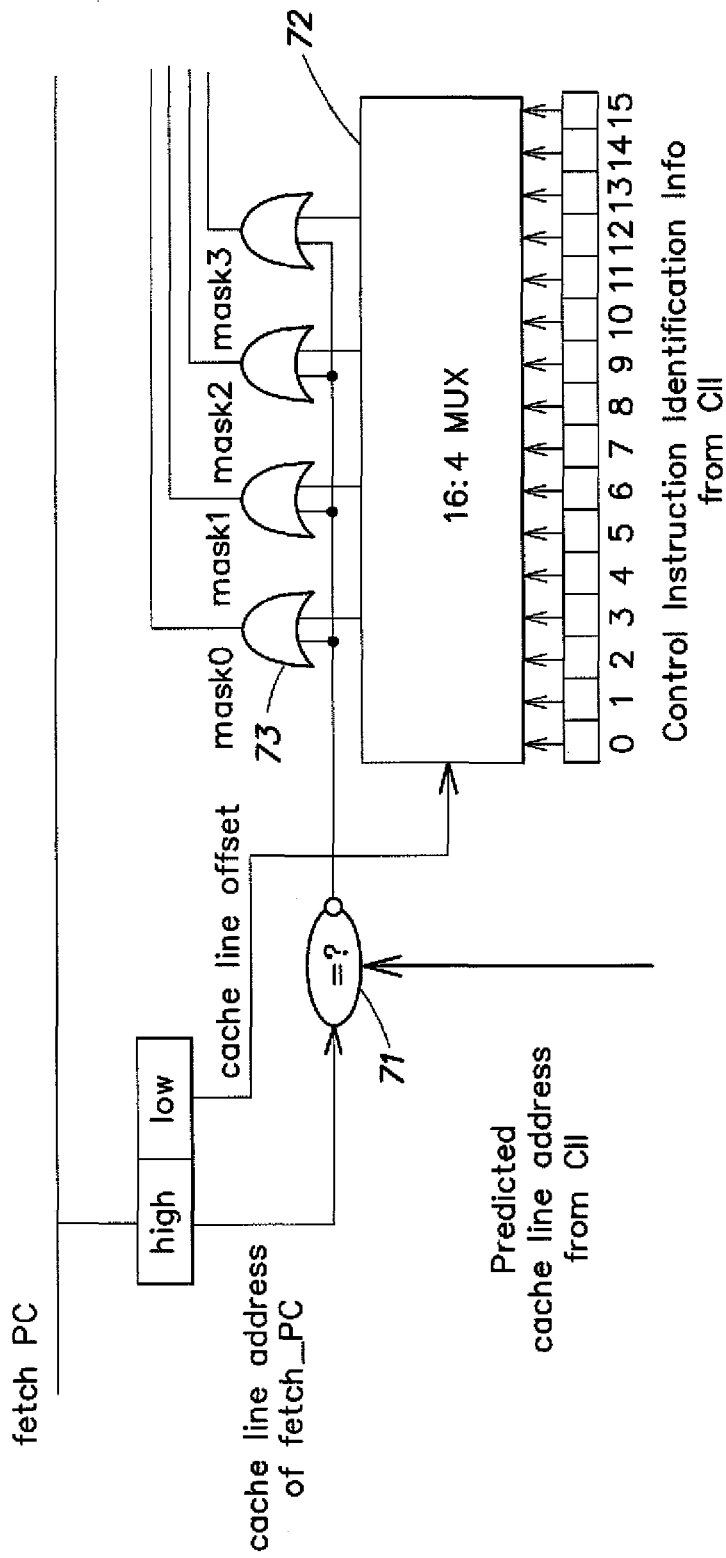
FIG. 7 shows a circuit that generates mask signals for the branch target buffer and/or branch history table, according to some embodiments.

FIG. 7 shows a diagram illustrating a mask signal generation circuit that receives the predicted address and the control identification information from the control instruction identification unit 25, and generates mask signals that can be used to enable/disable inputs of the BTB and/or BHT, according to some embodiments. In this example, the control identification information 25 is provided to a 16:4 multiplexer (MUX) 72 that selects four of the sixteen instructions corresponding to the four instructions being fetched. The low order bits of the current fetch PC may be used to select the control instruction identification information 25 that corresponds to the four instructions being fetched. For example, if a cache line includes sixteen instructions, MUX 72 may use the low-order bits of the fetch PC to determine which four instructions are currently being fetched. The four signals generated by the 16:4 MUX 72 are each provided to the respective first inputs of four OR gates of mask signal generation logic 73. As shown in FIG. 7, the high order bits of the fetch PC corresponding to the cache line address are compared with the predicted address from the control instruction identification unit 25 by comparison unit 71. The second inputs of the OR gates receive the complement of the result of the comparison between the actual and predicted address. Based on the first and second inputs, the OR gates produce mask signals mask0-mask3 that can be used for enabling/disabling inputs to the BTB and/or BHT, and shown in FIGS. 3 and 4. If the two compared addresses are equal, then the second inputs to the OR gates are low, and the mask signals are equal to the control identification information for the four instructions. If the two addresses are not equal, then the address predicted by the control instruction identification unit 25 was not correct, which means that the control identification information does not correspond to the instructions currently being fetched. As a result, the second inputs to the OR gates are high, causing all of the mask signals to be high, allowing all of the instructions to be looked up in the BTB and BHT. However, it should be appreciated that this is just an example, and any suitable mask signal generation circuit may be used.

As discussed above, some instructions are control flow instructions and some instructions are non control flow instruction. As used herein, the term "non control flow instruction" refers to an instruction that is not a control flow instruction. Examples of control flow instructions include instructions that are capable of performing jump or branch operations. In the MIPS32 architecture, for example, the following instructions are control flow instructions: b, bal, beq, beql, bgez, bgezal, and bgezall (branch-related instructions); and j, jal, jr, and jalr (jump-related instructions). However, it should be appreciated that this is a non-exclusive list of instructions. Furthermore, any suitable architecture may be used, as MIPS32 is just one example.

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A microprocessor for executing instructions, wherein the microprocessor fetches a group of instructions comprising at least one control flow instruction and at least one non-control flow instruction, the microprocessor comprising:
    at least one decoder to pre-decode the group of instructions to generate control instruction identification information identifying the at least one control flow instruction and the at least one non control flow instruction;
    a control instruction identification unit that stores control instruction identification information; and
    a branch prediction unit that, based on the control instruction identification information, checks for branch prediction information corresponding to the at least one control flow instruction and does not check for branch prediction information corresponding to the at least one non control flow instruction.

2. The microprocessor of claim 1, wherein the branch prediction unit comprises a branch history table.

3. The microprocessor of claim 1, wherein the branch prediction unit comprises a branch target buffer.

4. The microprocessor of claim 1, wherein the microprocessor is a superscalar processor that fetches the group of instructions in parallel.

5. The microprocessor of claim 1, wherein the microprocessor executes the instructions according to a pipeline comprising a plurality of stages, wherein the branch prediction unit checks for branch prediction information in a first stage of the plurality of stages, the microprocessor further comprising:
    an instruction cache from which the group of instructions is fetched in the first stage of the pipeline.

6. A microprocessor for executing instructions, wherein the microprocessor fetches a group of instructions comprising at least one control flow instruction and at least one non control flow instruction, the microprocessor comprising:

a control instruction identification unit that stores control instruction identification information identifying the at least one non control flow instruction in the fetched group of instructions; and a branch prediction unit that checks for branch prediction information corresponding to the at least one control flow instruction and does not check for branch prediction information corresponding to the at least one non control flow instruction, wherein the microprocessor executes the instructions according to a pipeline comprising a plurality of stages, wherein the branch prediction unit checks for branch prediction information in a first stage of the plurality of stages, wherein the microprocessor further comprises an instruction cache from which the group of instructions is fetched in the first stage of the pipeline, and wherein the microprocessor further comprises an instruction cache tag array storing the control instruction identification information, wherein the control instruction identification information identifies the at least one control flow instruction, wherein the control instruction identification unit receives the control instruction identification information from the instruction cache tag array.

7. The microprocessor of claim 6, further comprising at least one decoder that decodes the instructions to generate the control instruction identification information, wherein the instruction cache tag array receives the control instruction identification information from the at least one decoder.

8. A microprocessor for executing instructions, wherein the microprocessor fetches a group of instructions comprising at least one control flow instruction and at least one non control flow instruction, the microprocessor comprising:

a control instruction identification unit that stores control instruction identification information identifying the at least one non control flow instruction in the fetched group of instructions; and a branch prediction unit that checks for branch prediction information corresponding to the at least one control flow instruction and does not check for branch prediction information corresponding to the at least one non control flow instruction, wherein the microprocessor executes the instructions according to a pipeline comprising a plurality of stages, wherein the branch prediction unit checks for branch prediction information in a first stage of the plurality of stages, wherein the microprocessor further comprises an instruction cache from which the group of instructions is fetched in the first stage of the pipeline, and wherein the control instruction identification unit predicts an address of the instruction cache.

9. The microprocessor of claim 8, wherein the microprocessor uses a program counter to access the instruction cache, and wherein the microprocessor further comprises:

a comparison unit that compares at least a portion of the program counter with the address predicted by the control instruction identification unit.

10. The microprocessor of claim 9, wherein:

when the at least a portion of the program counter matches the address predicted by the control instruction identification unit, the branch prediction unit checks for branch prediction information corresponding to the at least one control flow instruction and does not check for branch prediction information corresponding to the at least one non control flow instruction.

11. In a microprocessor that executes instructions, a method of checking branch prediction information, the method comprising:

fetching a group of instructions comprising at least one control flow instruction and at least one non control flow instruction;

checking a branch prediction unit for branch prediction information corresponding to the at least one control flow instruction and not the at least one non control flow instruction; and pre-decoding the group of instructions to generate control instruction identification information identifying the at least one control flow instruction and the at least one non control flow instruction.

12. The method of claim 11, further comprising: storing the control instruction identification information in an instruction cache tag array.

13. The method of claim 11, further comprising:

storing the control instruction identification information in a control instruction identification unit.

14. The method of claim 11, further comprising:

accessing an instruction cache to fetch the group of instructions;

concurrently with accessing the instruction cache, accessing a control instruction identification unit storing control instruction identification information comprising the information that identifies, for each instruction of the group of instructions, whether the instruction is a control flow instruction; and checking the branch prediction unit based on the control instruction identification information concurrently with accessing the instruction cache.

* * * * *